US012608736B2

(12) United States Patent
Danna et al.

(10) Patent No.: US 12,608,736 B2
(45) Date of Patent: Apr. 21, 2026

(54) VEHICLE RECOMMENDATIONS BASED ON BROWSER CONTEXT

(71) Applicant: Capital One Services, LLC, McLean, VA (US)

(72) Inventors: Russell Danna, Rockwall, TX (US); Landon M. Nehmer, McKinney, TX (US); Jacob Anderson, Allen, TX (US); Michael Garner, Carrollton, TX (US)

(73) Assignee: Capital One Services, LLC, McLean, VA (US)

( * ) Notice: Subject to any disclaimer, the term of this patent is extended or adjusted under 35 U.S.C. 154(b) by 496 days.

(21) Appl. No.: 18/169,510

(22) Filed: Feb. 15, 2023

(65) Prior Publication Data

US 2024/0273599 A1 Aug. 15, 2024

(51) Int. Cl.
*G06Q 30/0601* (2023.01)
*G06F 16/9535* (2019.01)
*G06F 16/9537* (2019.01)

(52) U.S. Cl.
CPC ..... *G06Q 30/0631* (2013.01); *G06F 16/9535* (2019.01); *G06F 16/9537* (2019.01)

(58) Field of Classification Search
CPC ........... G06Q 30/0613; G06Q 30/0631; G06Q 30/0641; G06Q 30/0207–30/0277
See application file for complete search history.

(56) References Cited

U.S. PATENT DOCUMENTS

| | | | | |
|---|---|---|---|---|
| 8,825,505 | B1 * | 9/2014 | Alava | G06Q 40/08 |
| | | | | 705/4 |
| 10,810,656 | B1 * | 10/2020 | McCroskey | G06Q 30/0641 |
| 11,010,827 | B1 * | 5/2021 | Latronico | G06Q 40/03 |
| 11,100,562 | B2 | 8/2021 | Anderson et al. | |
| 11,227,322 | B1 * | 1/2022 | Vijayan | G06Q 30/0204 |
| 11,240,255 | B1 * | 2/2022 | Amin | H04L 63/04 |
| 11,270,168 | B1 * | 3/2022 | Otten | G06F 16/55 |
| 2012/0029990 | A1 * | 2/2012 | Fisher | G06Q 30/06 |
| | | | | 705/41 |

(Continued)

OTHER PUBLICATIONS

Third-Party_Web_Tracking_Policy_and_Technology (Year: 2012).*
(Continued)

*Primary Examiner* — Gautam Ubale
(74) *Attorney, Agent, or Firm* — Harrity & Harrity, LLP

(57) ABSTRACT

In some implementations, a recommendation system may receive information related to a browser context associated with the client device. The recommendation system may generate a vehicle feature vector that includes an array of elements to represent a plurality of vehicle attributes. The recommendation system may apply a similarity model to the vehicle feature vector to determine a vehicle recommendation dataset that includes a plurality of vehicles that are each associated with a respective set of vehicle attributes. The recommendation system may filter the vehicle recommendation dataset based on a subset of the information related to the browser context associated with the client device that indicates a profile of a user associated with the client device. The recommendation system may provide information related to the vehicle recommendation dataset to the client device for display in an interface of the client device.

20 Claims, 5 Drawing Sheets

400 →

410 — Receive, from an application executing on a client device, information related to a browser context associated with the client device, wherein the browser context includes a historical pattern of browser interactions with content related to vehicles 420 — Generate a vehicle feature vector that includes an array of elements to represent a plurality of vehicle attributes, wherein each element in the array of elements has a value to represent a user preference related to a corresponding vehicle attribute based on the historical pattern of browser interactions with the content related to vehicles 430 — Apply a similarity model to the vehicle feature vector to determine a vehicle recommendation dataset that includes a plurality of vehicles that are each associated with a respective set of vehicle attributes 440 — Filter the vehicle recommendation dataset based on a subset of the information related to the browser context associated with the client device that indicates one or more financing preferences associated with a user associated with the client device 450 — Provide information related to the vehicle recommendation dataset to the client device for display in an interface associated with the client device

(56) References Cited

U.S. PATENT DOCUMENTS

| | | | |
|---|---|---|---|
| 2012/0178366 A1* | 7/2012 | Levy .................. | G06K 7/10237 |
| | | | 455/41.1 |
| 2013/0166436 A1* | 6/2013 | Eze ........................ | G06Q 40/03 |
| | | | 705/38 |
| 2015/0235225 A1* | 8/2015 | Christie ................. | G06K 19/16 |
| | | | 705/72 |
| 2016/0125459 A1* | 5/2016 | Tognetti .............. | G06F 16/9535 |
| | | | 705/14.53 |
| 2016/0307174 A1* | 10/2016 | Marcelle ........... | G06Q 30/0621 |
| 2016/0364783 A1* | 12/2016 | Ramanuja .......... | G06Q 30/0625 |
| 2017/0287038 A1* | 10/2017 | Krasadakis ........ | G06Q 30/0201 |
| 2018/0157499 A1* | 6/2018 | Lee ......................... | G06F 9/451 |
| 2018/0189597 A1* | 7/2018 | Johri .................. | G06V 10/7784 |
| 2020/0104288 A1* | 4/2020 | Tao ........................ | G06F 16/23 |
| 2020/0134651 A1* | 4/2020 | Perry ................. | G06Q 30/0236 |
| 2021/0182933 A1* | 6/2021 | Subramanian ..... | G06Q 30/0631 |
| 2021/0233164 A1* | 7/2021 | Gaur .................. | G06Q 30/0627 |
| 2021/0342913 A1* | 11/2021 | Chow ..................... | G06N 3/08 |

OTHER PUBLICATIONS

Shopify—Shop Augmentation and Recommendation System (Year: 2023).*
Guo, "Improving the Performance of Recommender Systems by Alleviating the Data Sparsity and Cold Start Problems," Proceedings of the Twenty-Third International Joint Conference on Artificial Intelligence, 2013, 2 pages.

* cited by examiner

100

125

Filter vehicle recommendations
based on consumer profile
derived from browser context

130

Provide vehicle recommendations

Client Device

Recommendation
System

Inspired by your browsing history

MSRP $24,896

Get Pre-Qualified

2014 Minivan
Available at nearby dealer

400

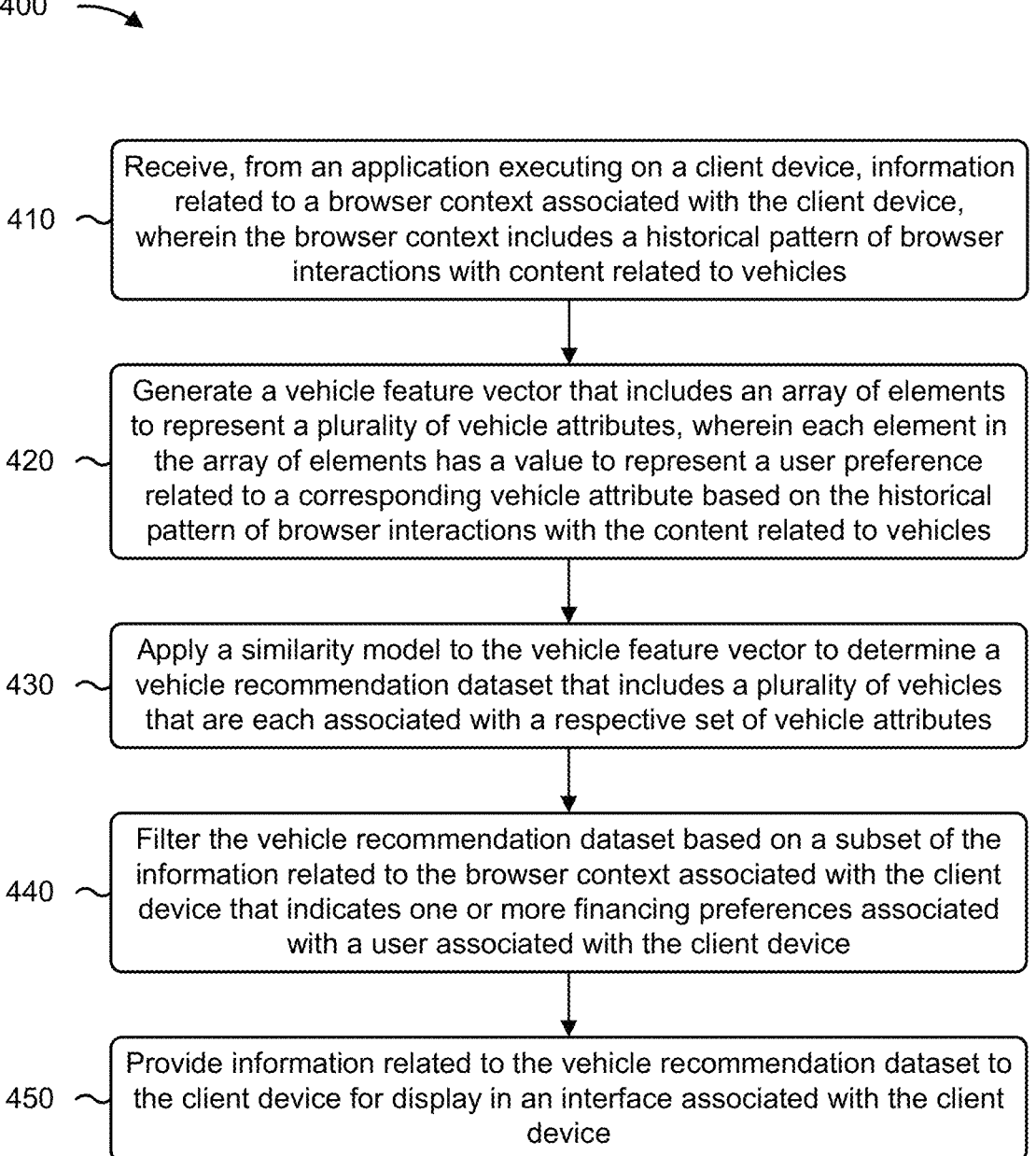

410 ~ Receive, from an application executing on a client device, information related to a browser context associated with the client device, wherein the browser context includes a historical pattern of browser interactions with content related to vehicles 420 ~ Generate a vehicle feature vector that includes an array of elements to represent a plurality of vehicle attributes, wherein each element in the array of elements has a value to represent a user preference related to a corresponding vehicle attribute based on the historical pattern of browser interactions with the content related to vehicles 430 ~ Apply a similarity model to the vehicle feature vector to determine a vehicle recommendation dataset that includes a plurality of vehicles that are each associated with a respective set of vehicle attributes 440 ~ Filter the vehicle recommendation dataset based on a subset of the information related to the browser context associated with the client device that indicates one or more financing preferences associated with a user associated with the client device 450 ~ Provide information related to the vehicle recommendation dataset to the client device for display in an interface associated with the client device

FIG. 4

VEHICLE RECOMMENDATIONS BASED ON BROWSER CONTEXT

BACKGROUND

Recommendation systems, sometimes called recommender systems, are a type of information filtering system that provide suggestions for items that are most pertinent to a particular user. The suggestions (or recommendations) typically refer to various decision-making processes, such as what product to purchase, what music to listen to, or what online news to read. Recommendation systems are particularly useful when an individual needs to choose an item from a potentially overwhelming number of items that a service may offer and/or have potential relevance to a particular topic.

SUMMARY

Some implementations described herein relate to a system for providing vehicle recommendations based on browser context. The system may include one or more memories and one or more processors communicatively coupled to the one or more memories. The one or more processors may be configured to receive, from an application executing on a client device, information related to a browser context associated with the client device, wherein the browser context includes a historical pattern of browser interactions with content related to vehicles. The one or more processors may be configured to generate a vehicle feature vector that includes an array of elements to represent a plurality of vehicle attributes, wherein each element in the array of elements has a value to represent a user preference related to a corresponding vehicle attribute based on the historical pattern of browser interactions with the content related to vehicles. The one or more processors may be configured to apply a similarity model to the vehicle feature vector to determine a vehicle recommendation dataset that includes a plurality of vehicles that are each associated with a respective set of vehicle attributes. The one or more processors may be configured to filter the vehicle recommendation dataset based on a subset of the information related to the browser context associated with the client device that indicates one or more financing preferences associated with a user associated with the client device. The one or more processors may be configured to provide information related to the vehicle recommendation dataset to the client device for display in an interface associated with the client device.

Some implementations described herein relate to a method for providing context-aware recommendations. The method may include receiving, by a device from an application executing on a client device, information related to a browser context associated with the client device, wherein the browser context includes a historical pattern of browser interactions with content related to vehicles and indicates a location associated with the client device. The method may include generating, by the device, a vehicle feature vector that includes an array of elements to represent a plurality of vehicle attributes, wherein each element in the array of elements has a value to represent a user preference related to a corresponding vehicle attribute based on the historical pattern of browser interactions with the content related to vehicles. The method may include applying, by the device, a similarity model to the vehicle feature vector to determine a vehicle recommendation dataset that includes a plurality of vehicles that are each associated with a respective set of vehicle attributes. The method may include filtering, by the device, the vehicle recommendation dataset based on a subset of the information related to the browser context associated with the client device that indicates a profile of a user associated with the client device, wherein the vehicle recommendation dataset is filtered such that the vehicle recommendation dataset excludes any vehicles that are not within a threshold distance of the location associated with the client device. The method may include providing, by the device, information related to the vehicle recommendation dataset to the client device for display in an interface associated with the client device.

Some implementations described herein relate to a non-transitory computer-readable medium that stores a set of instructions for a system. The set of instructions, when executed by one or more processors of the system, may cause the system to receive, from an application executing on a client device, information related to a browser context associated with the client device, wherein the browser context includes a historical pattern of browser interactions that includes one or more browser sessions in which the client device accessed a vehicle manufacturer or vehicle dealer website to view or configure a vehicle having a set of vehicle attributes. The set of instructions, when executed by one or more processors of the system, may cause the system to generate a vehicle feature vector that includes an array of elements to represent a plurality of vehicle attributes, wherein each element in the array of elements has a value to represent a user preference related to a corresponding vehicle attribute based on the historical pattern of browser interactions. The set of instructions, when executed by one or more processors of the system, may cause the system to apply a similarity model to the vehicle feature vector to determine a vehicle recommendation dataset that includes a plurality of vehicles that are each associated with a respective set of vehicle attributes. The set of instructions, when executed by one or more processors of the system, may cause the system to filter the vehicle recommendation dataset based on creditworthiness information associated with a user of the client device. The set of instructions, when executed by one or more processors of the system, may cause the system to provide information related to the vehicle recommendation dataset to the client device for display in an interface associated with the client device.

BRIEF DESCRIPTION OF THE DRAWINGS

FIG. 4 is a flowchart of an example process associated with vehicle recommendations based on browser context, in accordance with some embodiments of the present disclosure.

DETAILED DESCRIPTION

Figure 1A:
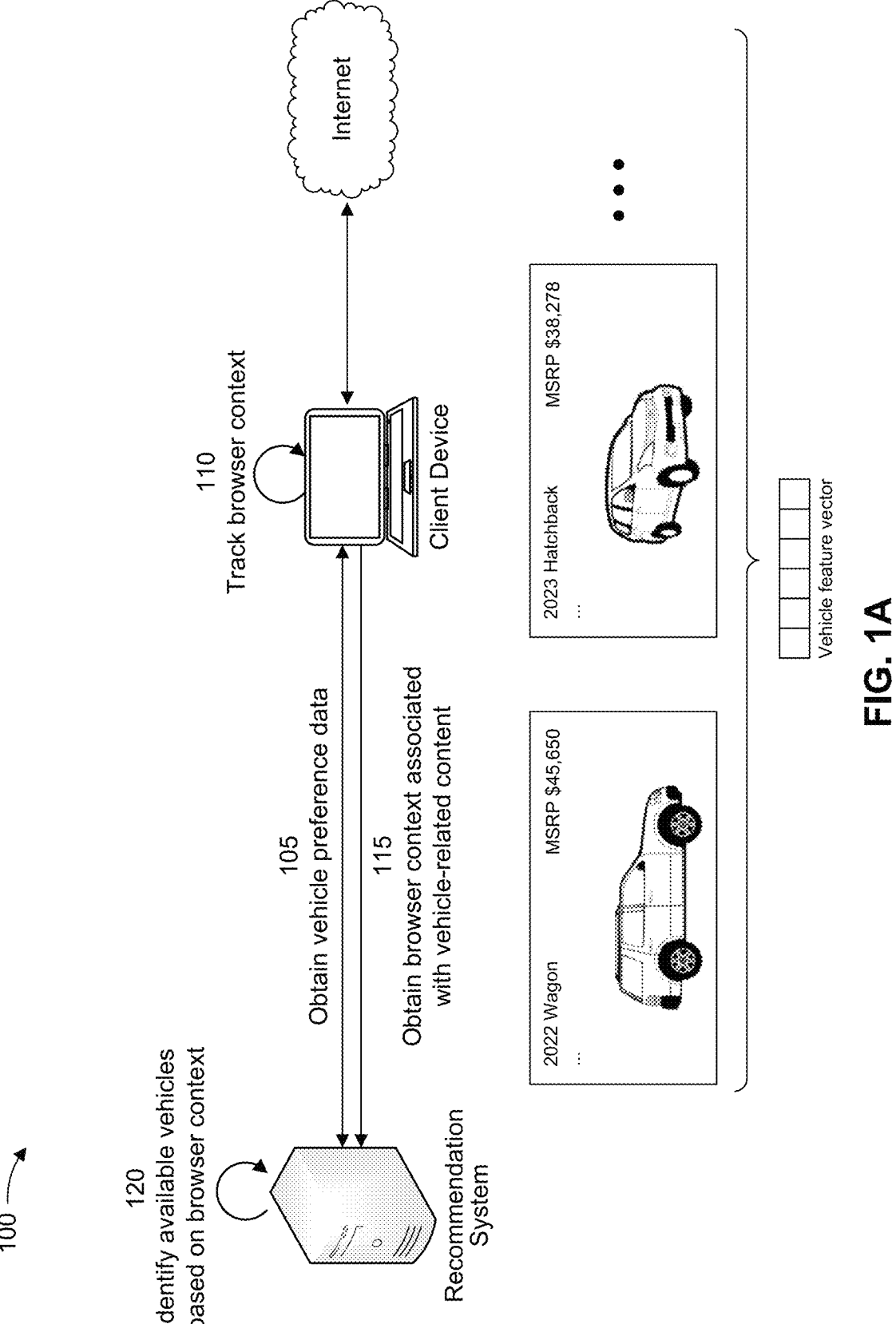
FIGS. 1A-1B are diagrams of an example implementation associated with vehicle recommendations based on browser context, in accordance with some embodiments of the present disclosure.

The following detailed description of example implementations refers to the accompanying drawings. The same reference numbers in different drawings may identify the same or similar elements.

Recommendation systems that provide users with personalized recommendations or suggestions from a plethora of potential choices, which can mitigate information overload and help to conserve computing resources that would otherwise be consumed when a user needs to choose an item from a potentially overwhelming number of options. Collaborative filtering is one widely used technique that recommendation systems often use to suggest relevant items to users. For example, the basic principle underlying collaborative filtering techniques is that recommendations can be made according to a model that is derived from past behavior of a user (e.g., items previously purchased or selected and/or ratings given to such items) as well as similar decisions made by other (ostensibly like-minded) users. However, collaborative filtering techniques suffer from significant drawbacks, including data sparsity (e.g., difficulty finding sufficient reliable similar users because active users have only rated a small portion of items), cold starts (e.g., difficulty generating accurate recommendations in cold conditions for new users or users that have only rated a very small number of items), and scalability (e.g., there are an exceedingly large number of users and products, which often requires significant computational power to calculate relevant recommendations). Another common approach that recommendation systems use is content-based filtering, which is generally based on an item description and a profile related to user preferences. However, one issue with content-based filtering techniques is that the recommendation system may be unable to learn user preferences from user actions regarding one content source and then apply the learned user preferences to other content types. In cases where a recommendation system is limited to recommending content of the same type that the user is already using, the value that the recommendation system provides is significantly less than when other content types from other services can be recommended.

Accordingly, although recommendation systems serve an important role in removing redundant or unwanted information from an information stream, recommendation systems are often unable to quantify similarities and differences between objects in a way that allows for recommendations based on the similarity of objects (e.g., "If you like X, you will also like Y"). Furthermore, recommendation systems are often unable to provide enough variability between a recommended item and an initial input item. For example, in a conventional recommendation system, a user who indicates a preference for a "Toyota Corolla" may be presented with a "Toyota Corolla Sport" option, which is too similar to be considered a distinct option from the initial input. Additionally, recommendation systems that provide vehicle recommendations are often unable to provide recommendations that incorporate variety. For example, a user may be asked to enter information about a make and model in order to view similar vehicles (all having the same make and model but different trim levels) but may not be presented with vehicles of a different make and/or model. Additionally, recommendation systems may present users with recommendations that are not particularly relevant or accurately responsive to the needs of the users, which may result in the users having to spend large amounts of time and computational resources to iteratively navigate a list of recommendations and traverse a user interface. Moreover, recommendation systems are conventionally based primarily on direct user input, which requires a user to have extensive knowledge of the field. In particular, vehicle recommendations often require an individual to directly enter vehicle preferences, such as a make, a model, a mileage, a location, optional features, and/or a condition. However, users may be unable to accurately recall or know the preferences they would like. Additionally, some users may be better suited for a style or option for an item that differs from a self-selected preference.

Some implementations described herein relate to a recommendation system that may provide improved vehicle recommendations that are personalized for a user based on a browser context associated with the user. For example, in some implementations, the recommendation system may obtain vehicle preference data from a user associated with a client device, where the vehicle preference data may be derived from responses that the user provides to questions in a questionnaire or survey that generally map to one or more vehicle features and/or vehicles. Furthermore, the vehicle preference data may be supplemented with information related to a browser context associated with the user, where the browser context may include information such as a browser history, interactions with known vehicle manufacturers and/or vehicle websites, metadata from interactions with services associated with one or more financial institutions, and/or fingerprinting data such as advertising impressions and/or advertising interactions. Furthermore, in some implementations, the browser context may be used to derive location information associated with the user, which can be used to filter vehicle recommendations to exclude vehicles that are not within a threshold distance of the user.

Accordingly, in some implementations, the vehicle preference data and the browser context can be used to generate a vehicle feature vector that includes an array of various data units (or elements) to represent the preferences of the user with regard to various vehicle attributes, and cosine distance calculations may be used to generate a vehicle recommendation dataset that includes one or more vehicles that may be relevant to the user based on the cosine distance calculations. Furthermore, in some implementations, the browser context associated with the user may be used to filter or refine the vehicle recommendation dataset by identifying vehicles that are available to purchase from dealers or sellers that are located near the user and/or that match or closely match a desired make and model at a price that has a high pre-approval or pre-qualification probability for the user. In addition, the recommendation system may utilize metadata from one or more micro-frontend widgets that are running on vehicle dealer websites to identify vehicles that the user is likely to qualify to purchase (e.g., including cases where the recommended vehicles have a different make and model due to the user having a high likelihood of being rejected for financing on a vehicle associated with the user browsing history).

In this way, the recommendation system described herein may apply a mapping to vehicles such that the recommendation system is better able to provide recommendations that take into account the similarities between different vehicle attributes (e.g., considering sport utility vehicles (SUVs) to be more similar to minivans than coupes). Additionally, the recommendation system described herein may provide a capability to interpret the responses that a user provides to questions about the user's vehicle usage into desired vehicle features (or vehicle attributes) without requiring the user to know a particular make and model in advance. Furthermore, the recommendation system described herein may limit reliance on the user's self-stated preference or knowledge regarding certain vehicle makes, models, and/or attributes, and may optimally match the user's needs to vehicles that meet the user's financial profile, which can save considerable resources that would otherwise be wasted if the user were to pursue financing for a vehicle that is outside the user's financial reach. Moreover, the recommendation system described herein may ensure that there is variability in the set of vehicles recommended to the user. For example, rather than viewing a small number of vehicles that are essentially similar (e.g., the same make and model or vehicle type), the recommendation system described herein can provide the user with different vehicle recommendations associated with a broader scope of potential relevance. In this way, the recommendation system described herein may provide improved vehicle recommendations that reduce the time and resources that the user expends interacting with a user interface to view different vehicles, browse different websites to conduct vehicle research or search for available vehicles, and/or apply for vehicle financing.

Figure 1B:
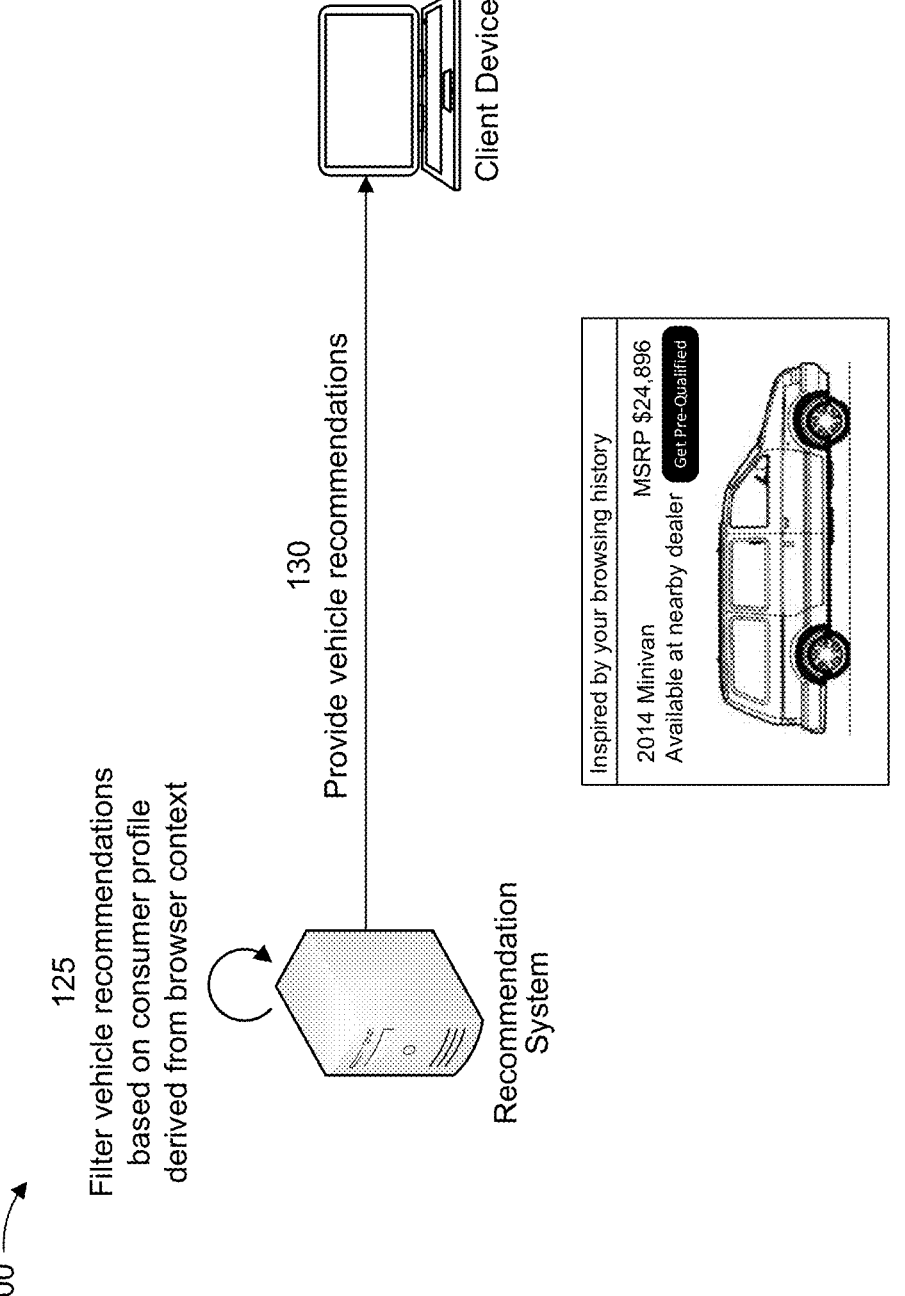

FIGS. 1A-1B are diagrams of an example 100 associated with vehicle recommendations based on browser context. As shown in FIGS. 1A-1B, example 100 includes a client device and a recommendation system. The client device and the recommendation system are described in more detail in connection with FIG. 2 and FIG. 3.

As shown in FIG. 1A, and by reference number 105, the recommendation system may obtain vehicle preference data from a user of the client device. For example, in some implementations, the recommendation system may send information related to a questionnaire or survey to the client device (e.g., responsive to the user of the client device registering for a vehicle recommendation service), and the questionnaire or survey may be presented to the user via a user interface associated with the client device. For example, as described herein, the user interface may be associated with a vehicle recommendation application that executes on the client device, a website rendered in a browser of the client device, or the like. In some implementations, the user interface may be configured to present the user of the client device with information related to one or more recommended vehicles (e.g., images, descriptions, and/or attributes associated with the one or more recommended vehicles) such that the user may browse the collection of recommended vehicles. Furthermore, as described herein, the user interface may present the user of the client device with the questionnaire or survey from which the recommendation system determines the vehicle preference data associated with the user. Furthermore, as described in further detail herein, the user interface may be configured to track, store, and/or convey information regarding a browser context associated with the user of the client device, including a historical viewing pattern related to browser interactions with content that relates to one or more vehicles that are of potential interest to the user.

In some implementations, as described herein, the recommendation system may send information related to a questionnaire or survey to the client device, and may receive vehicle preference data from the user of the client device in the form of responses to the questionnaire or survey (e.g., the vehicle preference data may generally indicate a vehicle or one or more vehicle features that the user prefers). For example, in some implementations, the responses provided by the user may indicate one or more vehicle makes and/or one or more vehicle models that the user prefers. In another example, the responses provided by the user may indicate more granular information related to vehicle attributes that are preferred by the user. For example, the questionnaire or survey may include questions such as "How many people will usually ride in the car?," "How often will you drive the car?," "How far will you drive the car?," or the like, and the user of the client device may provide responses to one or more of the questions to indicate the vehicle preference data. In some implementations, each question in the questionnaire or survey presented to the user may map to one or more vehicles and/or vehicle features or attributes. For example, the question "How many people will usually ride in the car?" may map to vehicle features such as body, style, number of seats, number of rows, or the like. In another example, the question "How far will you drive the car?" may map to vehicle features such as engine or motor type (e.g., gasoline, electric, or hybrid), fuel economy, or the like. In some implementations, the vehicle preference data may include user preferences directly provided by the user (e.g., a vehicle make and model, or direct answers for body, style, engine or motor, and/or other vehicle attributes). In some implementations, the vehicle preference data may include user preferences derived from answers to the questionnaire or survey, which may correspond to a particular vehicle, and/or may correspond to a particular vehicle feature. In some implementations, the recommendation system may store the vehicle preference data in a data repository, which may also store vectorized information associated with each vehicle in a vehicle inventory. For example, the vehicle preference data and the vectorized information associated with the vehicles in the vehicle inventory may include information related to vehicle features or attributes such as make, model, year, fuel efficiency, mileage, price, engine or motor type, fuel type, drive train, exterior color, body style, condition, and/or transmission, among other examples.

As further shown in FIG. 1A, and by reference number 110, the client device may be configured to track a browser context associated with the user of the client device. For example, in some implementations, a web browser executing on the client device may be configured to track the browser context while the user is browsing the Internet. For example, in some implementations, the web browser executing on the client device may be configured to run one or more client-side browser fingerprinting scripts (e.g., FingerprintJS, ImprintJS, or ClientJS) that can collect substantial diverse and stable information from the web browser, including a browser history. Additionally, or alternatively, one or more browser extensions that are installed and executed within the web browser may be configured to generate a browser fingerprint related to browser activity that occurs on the client device, where the browser extension(s) may have additional permissions or access to additional information that may provide more granularity and/or complexity to the browser fingerprint. For example, in some implementations, the browser context that is tracked on the client device may generally capture detailed information related to an environment in which document objects are presented on the client device (e.g., a tab, window, iframe, or frame associated with a web page may generally contain a browser context associated with a session history that lists one or more document objects that have been presented, are being presented, or will be presented within a browser context). Furthermore, a browser context may include information such as a creator browser context that indicates a parent or creator browser context that was responsible for creating the browser context, a child browser context that the browser context was responsible for creating, or a nested browser context when the browser context includes one or more elements that were instantiated within another browser context. Accordingly, as described herein, the browser context that is tracked by the client device may aggregate substantial information related to the browsing activity and/or browsing habits of the user of the client device, including browsing patterns, browsing histories, browsing sessions, navigation between different websites, resource loading, and/or event loops related to interactions between a script and a document object model (DOM). In general, the client device may be configured to track all browser activity on the client device (e.g., with the possible exception of incognito or private browsing or other activity that the user specifically requests to not be tracked) to derive a browser fingerprint based on historical patterns of browser interactions with content related to vehicles, metadata obtained from one or more services that indicates the creditworthiness of the user, and a profile associated with advertising content presented to the user (e.g., advertising impressions and/or click-throughs that are indicative of user interests).

As further shown in FIG. 1A, and by reference number 115, the recommendation system may obtain (e.g., receive from the client device) information related to the browser context of the client device, which may include information related to a historical pattern of browser interactions with vehicle-related content. For example, the browser context may include information related to one or more browser sessions in which a user visited a vehicle dealer or manufacturer website to view information related to one or more vehicles or vehicle models, one or more sessions in which the user interacted with a vehicle dealer or manufacturer website to configure one or more options for a specific vehicle (e.g., trim levels or other customizations), one or more sessions in which the user chatted with personnel at a vehicle dealer to discuss a potential vehicle purchase, interactions with third-party websites or postings by third-party sellers of vehicles (e.g., auction websites such as eBay, social media postings on sites such as Facebook Marketplace, online classified advertisements in venues such as Craigslist, or the like), and/or general browser activity that includes interactions with vehicle-related content (e.g., visits to consumer report websites, vehicle review websites, vehicle comparison websites, or the like), among other examples. Furthermore, in some implementations, the browser context may include other sources of information that may relate to or otherwise impact which vehicles are potentially relevant to the user. For example, in some implementations, the browser context may include metadata from one or more websites associated with a financial institution (e.g., account balances, asset values, debts, credit scores, and/or other information that may indicate a creditworthiness or preferred loan configuration of the user) and/or AdSense information or other suitable information that indicates advertising impressions, click-throughs, or other information that may be relevant to vehicle preferences of the user. Additionally, or alternatively, financial information associated with the user may be obtained using other suitable techniques, such as a voluntary credit pull to which the user consents (e.g., by clicking or otherwise selecting a prequalification option on a website to create an association between the user and the browser context that the user consents to sharing) and/or the user self-configuring a preferred budget. Accordingly, in some implementations, the recommendation system may be configured to receive the browser context that includes the detailed browser fingerprint based on the historical pattern of the user performing browser interactions with content related to vehicles, services that indicate the financial status of the user, and/or advertising content presented to the user, among other examples. For example, in some implementations, the recommendation system may search the browser context information to identify the N most recent vehicles viewed in the web browser, including any specific attributes associated with the N (e.g., five or ten) most recent vehicles viewed in the web browser. Additionally, or alternatively, the browser context may be used to derive a demographic profile associated with the user, including an age, gender, location, and/or creditworthiness of the user.

As further shown in FIG. 1A, and by reference number 120, the recommendation system may identify a vehicle recommendation dataset that includes one or more available vehicles based on the browser context obtained from the client device. For example, in some implementations, the recommendation system may use the browser context received from the client device, either alone or in combination with the vehicle preference data obtained from the user of the client device (e.g., responses to the questionnaire or survey), to generate a weighted feature dataset. In some implementations, as described herein, the weighted feature dataset may be represented as a vehicle feature vector that includes an array of elements, where each element in the array represents a particular vehicle attribute (e.g., a make, model, year, fuel efficiency, mileage, price, engine or motor type, fuel type, drive train, exterior color, body style, condition, or transmission, among other examples). For example, in some implementations, the recommendation system may generate the weighted feature dataset by mapping a portion of the browser context that is relevant to interactions with vehicle-related content to a browser-based vehicle preference dataset. In some implementations, the recommendation system may also map the vehicle preference data derived from the questionnaire or survey responses to a user-specified vehicle preference dataset. Accordingly, as described herein, the browser-based vehicle preference dataset and the user-specified vehicle preference dataset may each be represented as a vehicle feature vector that includes an array of elements to represent the preference(s) of the user with respect to various vehicle attributes.

In some implementations, in cases where the recommendation system uses the questionnaire or survey responses to generate the user-specified vehicle preference dataset, the responses that the user provided to each question presented in the questionnaire or survey may map to a set of vehicle attributes, and the recommendation system may then aggregate sets of vehicle attributes to form the user-specified vehicle preference dataset. In some implementations, the user-specified vehicle preference dataset may have a different size and/or a different dimension than the browser-based vehicle preference dataset and/or the weighted feature set discussed in further detail elsewhere herein. For example, in cases where answers to two different questions map to two different sets of vehicle attributes (e.g., a first answer maps to a first set of vehicle attributes, such as {SUV, 6-cylinder, 2017}, and a second answer maps to a second set of vehicle attributes, such as {SUV, 8-cylinder, 2016, 2017}), the answers to the two questions may be aggregated to form a user-specified vehicle preference dataset expressed as {SUV: 2; 6-cylinder: 1; 8-cylinder: 1; 2016:1; 2017:2}. In some embodiments, the user-specified vehicle preference dataset may include a field for each possible vehicle attribute, and each field may have an integer value associated with the corresponding vehicle attribute. For example, the integer value may represent a frequency at which the questionnaire answers provided by the user are associated with a particular vehicle attribute. In some implementations, the integer value may be determined based on an indicated importance associated with a particular vehicle attribute, based on the questionnaire responses provided by the user. For example, if a user were to answer "Yes" to the question of "Will you regularly be carrying more than 2 people?" the user response may map to {SUV, SEDAN} (e.g., vehicles that can comfortably seat more than two people).

In some implementations, to map the browser context received from the client device to the browser-based vehicle preference dataset, the recommendation system may obtain the browsing history of a user on the user interface and determine vehicle attributes associated with one or more past or recently viewed vehicles based on subset of the browser interactions with content related to vehicles. For example, in some implementations, the recommendation system may determine the vehicle attributes associated with the N past or recently viewed vehicles, where N may generally be a positive integer value (e.g., 1, 3, 5, 10, 20, 100, or another suitable quantity). For example, in some implementations, the recommendation system may analyze the browser history or browsing habits recorded in the browser context to identify vehicles that the user viewed based on interactions with known vehicle manufacturer or dealer websites, consumer report websites, vehicle research websites, vehicle valuation websites, used car websites, or the like. Additionally, or alternatively, the vehicles viewed by the user may be determined based on interactive sessions in which the user configured or explored different combinations of vehicle attributes (e.g., configuring the same vehicle with a V4 and a V6 engine) and/or advertising impressions or advertising click-throughs (e.g., an advertising impression may indicate one or more vehicle attributes that an advertising system determined to be potentially relevant to the interests of the user, and an advertising click-through may indicate one or more vehicle attributes that are confirmed to be relevant to the interests of the user).

Additionally, or alternatively, the browser context may include a browser history related to interactions with one or more financial service providers, which may be indicative of a potential price range that the user is interested in (e.g., based on the user modeling a potential vehicle loan, applying to pre-qualify for a vehicle loan, and/or self-configuring budget information, among other examples). Additionally, or alternatively, the interactions with financial service providers may indicate a financial status of the user (e.g., based on a credit score, credit history, credit usage, payment history, available credit, income, or other factors related to the user's ability to finance a vehicle, which may be available to the recommendation system based on a soft credit pull and/or based on the user holding one or more accounts with a financial institution associated with the recommendation system). For example, in some implementations, the recommendation system may be configured to provide recommended loan structuring information, such as an indication that the user would qualify to purchase or lease a vehicle with a given monthly payment over a given term (e.g., a number of months or years), which may be based on a credit pull or other information related to a creditworthiness of the user. In another example, the recommendation system may gather information related to the financial status of the user from the available browser context, and may request that the user consent to a credit pull that would then be used to provide reliable prequalification information that could be used to provide accurate recommended loan structuring information. Additionally, or alternatively, the recommended loan structuring information may be independent of actual creditworthiness information (e.g., may be based on any suitable financial status information that can be harvested from the browser context), and may be used to prequalify the user for certain financing options, and/or to estimate or predict financing terms that would likely be affordable for the user or feasible to be financed from a lender. Further, in some implementations, the browser context that is used to derive the browser-based vehicle preference dataset may include information related to one or more browser interactions with a micro-frontend widget or other suitable application that may be running on a vehicle seller's website. For example, as described herein, a micro-frontend widget may generally refer to a user-facing component that can be tested, deployed, and updated separately from a website that may be running the micro-frontend widget. In this context, a vehicle dealer website may include a micro-frontend widget to enable a user to model or apply for financing on a specific vehicle listed on the vehicle dealer website. Accordingly, the metadata associated with the interaction(s) with the micro-frontend widget may provide further insight into the vehicle preferences and/or creditworthiness of the user.

In some implementations, based on the browser context received from the client device, the recommendation system may determine one or more vehicle attributes for each browser interaction with content related to a vehicle or content relevant to purchasing a vehicle (e.g., financial metadata that may not have any relationship to a specific vehicle or vehicle attribute). For example, a browser interaction with content related to a 2022 Volvo V90 Cross Country may map to: {Wagon, 4-Cylinder, 2022}. Similar to the process described above with respect to the user-specified vehicle preference dataset, the set of vehicle attributes for each of the past or recently viewed vehicles may be aggregated in the browser-based vehicle preference dataset. For example, if a user viewed two SUVs in succession on the user interface, where the first browser interaction is with a 2016 model with a 6-cylinder engine and the second browser interaction is with a 2017 model with an 8-cylinder engine, the browser-based vehicle preference dataset may be represented as: {SUV: 2; 6-cylinder: 1; 8-cylinder: 1; 2016:1; 2017:1}. In some implementations, the browser-based vehicle preference dataset may include a field for each possible vehicle attribute and may have an integer value associated with each vehicle attribute, where the integer value may represent the frequency at which a particular vehicle attribute appeared in the browsing context of the user.

In some implementations, to generate the weighted feature dataset, the recommendation system may determine an influence factor to apply to each vehicle attribute included in the browser-based vehicle preference dataset and/or the user-specified vehicle preference dataset. Based on the influence factor applied to each vehicle attribute, the weighted feature dataset may aggregate the browser-based vehicle preference dataset and/or the user-specified vehicle preference dataset in accordance with the determined influence factor to form the weighted feature dataset. For example, the influence factor may be represented as a multiplicative factor, percentage, and/or weighting that represents a degree to which a preference indicated in the browser-based vehicle preference data (e.g., based on browser context) or the user-specified vehicle preference data (e.g., based on explicit or implicit user questionnaire or survey answers) better represents of the user's true preferences that are used to form the basis of the vehicle recommendations generated by the recommendation system. For example, the user may be a car enthusiast who visits websites for high-end luxury vehicles that are well outside the user's financial means, and may provide questionnaire answers indicating a preference to potentially purchase a more modestly priced vehicle. In this example, when recommending vehicles for the user to potentially purchase, the influence factor may weigh the vehicle attributes indicated in the user-specified vehicle preference dataset more heavily than the vehicle attributes indicated in the browser-based vehicle preference dataset. In some implementations, generating the weighted feature dataset may include initially populating the weighted feature dataset based on the browser-based vehicle preference dataset and then refining the weighted feature dataset based on the user-specified vehicle preference dataset. In such cases, the browser-based and user-specified vehicle preference datasets may be aggregated to generate the weighted feature dataset. Alternatively, in some implementations, the weighted feature dataset may be based only on the browser-based vehicle preference dataset.

In some implementations, the weighted feature dataset may be represented as a vehicle feature vector that includes an array of elements, each of which represents a particular vehicle attribute. Furthermore, in some implementations, the array corresponding to the vehicle feature vector may include one or more elements for each possible vehicle attribute that the recommendation system evaluates when making vehicle recommendations. For example, in some implementations, the vehicle feature vector may include an array with elements to represent vehicle attributes that include a year, make, model, fuel efficiency, mileage, price, engine, diesel, gasoline, flexible-fuel, hybrid, electric, front wheel drive, rear wheel drive, all-wheel drive, four-wheel drive, two-wheel drive, white, brown, yellow, gold, black, gray, silver, red, blue, green, orange, bronze, beige, purple, burgundy, pink, turquoise, convertible, couple, hatchback, sedan, SUV, pickup, minivan, van, wagon, new, used, automatic, and/or manual, among other examples.

In some embodiments, as described herein, the vehicle feature vector may generally include one or more elements to represent each possible vehicle attribute that the recommendation system evaluates when generating a vehicle recommendation dataset. However, some vehicle attributes may be represented using only one element, while others may be represented using multiple elements to represent different choices or options for the corresponding attribute. For example, the vehicle feature vector may include one element to represent vehicle attributes such as a fuel efficiency, mileage, price, engine, year, or other attribute that can only have one value. Furthermore, the vehicle feature vector may include multiple elements to represent vehicle attributes that can have different values, such as a fuel type (e.g., including elements for diesel, gasoline, flexible-fuel, hybrid, or electric), exterior color (e.g., including elements for white, brown, yellow, gold, black, gray, silver, red, blue, green, orange, bronze, beige, purple, burgundy, pink, turquoise), drive type (e.g., including elements for front wheel drive, rear wheel drive, all-wheel drive, four-wheel drive, or two-wheel drive), body style (e.g., including elements for convertible, coupe, hatchback, sedan, SUV, pickup, minivan, van, or wagon), condition (e.g., including elements for new or used), and/or transmission (e.g., including elements for automatic or manual), among other examples.

In some embodiments, vehicle attributes that are represented in the vehicle feature vector using one element only may have a value between 0 and 1. For example, a range of possible fuel efficiencies may be mapped to values between 0 and 1 (e.g., with 1 being the most fuel-efficient and 0 being the least fuel-efficient). In another example, for body style, a convertible may be expressed as 0.22, a coupe may be expressed as 0.29, a sedan may be expressed as 0.36, a hatchback may be expressed as 0.43, a wagon may be expressed as 0.5, an SUV may be expressed as 0.57, a pickup may be expressed as 0.64, a minivan may be expressed as 0.71, and a van may be expressed as 0.78. In another example, for an engine, a 2-cylinder may map to 0.15, a 4-cylinder to 0.29, 6-cylinder to 0.43, and 10-cylinder to 0.71. In some implementations, different engine options from the browser-based and/or user-specified vehicle preference datasets may be averaged to form the weighted feature dataset. For example, if the weighted feature dataset has a value of 3 associated with a 4-cylinder engine and a value of 2 associated with a 6-cylinder engine, the averaged value in the engine element of the vehicle feature vector becomes (3*0.15+2*0.29)/5. In some embodiments, the mapping to values between 0 and 1 may capture similarities between entries. For example, a 2-cylinder engine that is expressed as 0.15 may be more similar to a 4-cylinder engine expressed as 0.43 than a 10-cylinder engine expressed as 0.71.

In some implementations, the recommendation system may use the techniques described herein to generate the vehicle feature vector based on the browser-based vehicle preference dataset or based on a combination of the browser-based and user-specified vehicle preference datasets. The recommendation system may then apply a similarity model to the vehicle feature vector to generate a vehicle recommendation dataset based on the vehicle feature vector. For example, any suitable similarity model or technique may be used to generate the vehicle recommendation set based on a comparison between the vehicle feature vector that is based at least in part on the user's vehicle preferences that are determined from the user's browser context and vectorized information associated with each vehicle in a vehicle inventory associated with the recommendation system (e.g., vehicles that are available to purchase from a dealer, manufacturer, or other seller associated with the recommendation system). In some implementations, the vectorized information associated with the vehicles in the vehicle inventory may be expressed in the same or a similar manner as the vehicle feature vector based on the user's vehicle preferences in order to facilitate application of the similarity model.

For example, in some implementations, the similarity model may be a cosine similarity model. In some implementations, the cosine similarity model may be configured to minimize the cosine distance between the vehicle feature vector derived from the weighted feature dataset and a vehicle represented as a vector. In some implementations, the recommendation system may perform cosine distance calculations between the vehicle feature vector based on the user's preferences and each vector that represents a vehicle available in a vehicle inventory. In this manner, a vehicle in the vehicle inventory having a set of attributes most similar to the vehicle feature vector may be determined by the recommendation system. In some implementations, applying the similarity model to the vehicle feature vector to determine the vehicle recommendation dataset may include generating a feature representation for each vehicle in the vehicle inventory based on a set of attributes associated with the respective vehicles, determining one or more similarity values between the feature representations for each respective vehicle and the vehicle feature vector representing the user's preferences, and selecting one or more vehicles corresponding to a subset of the feature representations having the closest determined similarity values (e.g., the lowest cosine distances). As a result, a value between 0 and 1 may be associated with each vehicle in the vehicle inventory, where the vehicles associated with relatively greater values (closer to 1) are representative of vehicles that are more similar to the ideal vehicle represented by the vehicle feature vector derived, at least in part, from the browser context associated with the client device.

As shown in FIG. 1B, and by reference number 125, the recommendation system may then filter the vehicle recommendation dataset based on a consumer profile derived from the browser context associated with the client device. For example, as described herein, the vehicle recommendation dataset may generally include information related to one or more vehicles that are available in a vehicle inventory associated with one or more vehicle manufacturers, dealers, or other sellers that are potentially relevant to the user (e.g., that the user may be interested in purchasing), which are identified based on the browser-based vehicle preference data or a combination of the browser-based vehicle preference data and the user-specified vehicle preference data. In particular, vehicles that are available in a vehicle inventory accessible to the recommendation system may be ranked according to their similarity (e.g., based on a cosine distance) to the vehicle feature vector that is based on the user vehicle preferences. In some implementations, before delivering recommendations related to the top-ranked vehicles to the client device, one or more filters may be applied to the vehicle recommendation dataset. For example, as described herein, the browser context obtained from the client device may include various sources of information that relate to a creditworthiness of the user, which may impact which vehicles the user for which the user is likely to be pre-approved or pre-qualified to finance. For example, in cases where the user holds one or more accounts at a financial institution that is associated with the recommendation system, the recommendation system may have access to various financial parameters that indicate the user's ability to obtain and repay a vehicle loan (e.g., credit score, income, or the like).

Additionally, or alternatively, the questionnaire responses provided by the user may include various details related to the financial situation of the user. In any case, the recommendation system may have a capability to model various vehicle loan structures to determine financing terms that the user is likely to qualify for, and the recommendation system may filter the vehicle recommendation dataset to exclude vehicles that may be outside the user's price range or otherwise associated with financing terms that the user is unlikely to be able to satisfy. Furthermore, in cases where the browser interactions associated with the client device include interactions with vehicles that the user may be unlikely to qualify for, the recommendation system may filter the vehicle recommendation system to increase the weighting or ranking of other vehicles that may be similar but have a higher probability of the user being able to be pre-qualified or pre-approved (e.g., recommending a used vehicle of the same make and model that may be significantly less expensive and/or recommending a different make or model that may be more affordable while also having a similar overall style and performance specifications as the vehicle(s) viewed in the browser history). Accordingly, the recommendation system may be configured to determine a probability of the user being able to qualify to enter into a transaction for each vehicle in the vehicle recommendation dataset, and any vehicles that the user is unlikely to qualify for may be removed from the vehicle recommendation dataset. Additionally, or alternatively, in cases where the probability of the user qualifying to enter into a transaction for a particular vehicle fails to satisfy a threshold, the recommendation system may recommend a vehicle associated with a different year, make, model, and/or other attributes for which the probability of the user qualifying to enter into a transaction satisfies the threshold.

Furthermore, in some implementations, the recommendation system may apply a filter to the vehicle recommendation dataset to ensure that recommended vehicles are available at locations (e.g., dealers or individual sellers) that are within a threshold distance or radius of the user. For example, the location of the user may be determined based on the browser context, or based on location data that is collected and reported by the client device (e.g., when the client device is a mobile device or other suitable device equipped with positioning capabilities). Additionally, or alternatively, the recommendation system may apply one or more filters to force variety between the makes and models that are included in the vehicle recommendation dataset. For example, the filter(s) may ensure that particular make and model combinations are not recommended more than once (or more than a threshold number of times) in any given set of recommended vehicles. In this example, the filter(s) may ensure that make and model combinations already aggregated into the vehicle recommendation dataset may be skipped when procuring additional recommendations to ensure distinctiveness in the make and model of the subset of vehicle recommendations displayed to the user via the client device.

As further shown in FIG. 1B, and by reference number 130, the recommendation system may then provide the (filtered) vehicle recommendations to the client device for display in a user interface of the client device. For example, a visual representation of the vehicle recommendation dataset may be provided for display in the user interface. For example, the visual representation of the vehicle recommendation dataset may include one or more profiles, charts, digital flip books, or the like. In some implementations, in cases where the user interacts with one or more recommendations included in the vehicle recommendation dataset, the interaction may be recorded in the browser context that is tracked by the client device, which may then be provided to the recommendation system to update the vehicle feature vector used to make subsequent vehicle recommendations. In this way, the vehicle recommendations provided by the recommendation system may become more accurate and/or relevant over time. Furthermore, in cases where the recommendation system is associated with a financial institution that offers vehicle financing, the visual representation of the vehicle recommendation dataset may include one or more options to apply for vehicle financing for a recommended vehicle. For example, because the vehicle recommendations provided to the client device are filtered to have deal structures that the user is likely to pre-qualify or be pre-approved for, the visual representation of the vehicle recommendations may include an option to obtain the pre-qualification or pre-approval to facilitate the user financing a recommended vehicle.

As indicated above, FIGS. 1A-1B are provided as an example. Other examples may differ from what is described with regard to FIGS. 1A-1B. For example, although the foregoing description relates to techniques that the recommendation system may use to provide vehicle recommendations based on a user browser context, the recommendation system described herein may be used or adapted to provide recommendations related to other suitable items (e.g., hotels, consumer goods, clothing, purses, and/or houses, among other examples), experiences (e.g., concerts, shows, and/or restaurants, among other examples), or the like.

Figure 2:
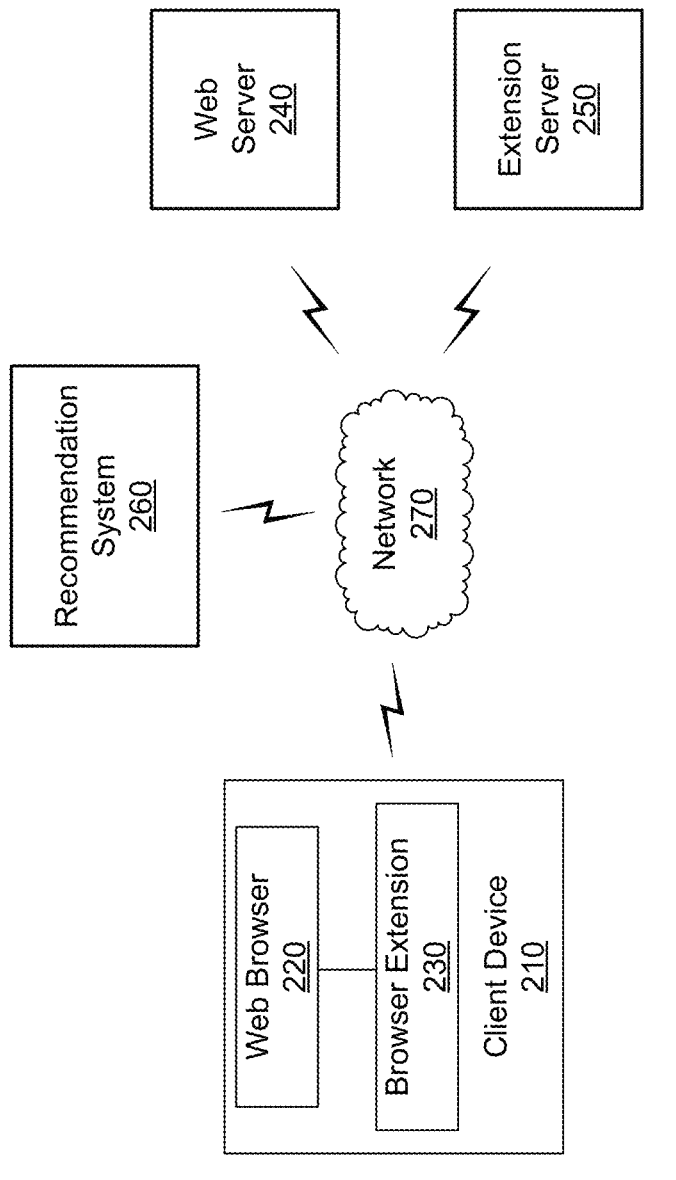
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a client device 210 (e.g., which may execute a web browser 220 and a browser extension 230), a web server 240, an extension server 250, a recommendation system 260, and a network 270. Devices of environment 200 may interconnect via wired connections, wireless connections, or a combination of wired and wireless connections.

The client device 210 may include a device that supports web browsing. For example, the client device 210 may include a computer (e.g., a desktop computer, a laptop computer, a tablet computer, and/or a handheld computer), a mobile phone (e.g., a smart phone), a television (e.g., a smart television), an interactive display screen, and/or a similar type of device. The client device 210 may host a web browser 220 and/or a browser extension 230 installed on and/or executing on the client device 210.

The web browser 220 may include an application, executing on the client device 210, that supports web browsing. For example, the web browser 220 may be used to access information on the World Wide Web, such as web pages, images, videos, and/or other web resources. The web browser 220 may access such web resources using a uniform resource identifier (URI), such as a uniform resource locator (URL) and/or a uniform resource name (URN). The web browser 220 may enable the client device 210 to retrieve and present, for display, content of a web page.

The browser extension 230 may include an application, executing on the client device 210, capable of extending or enhancing functionality of the web browser 220. For example, the browser extension 230 may be a plug-in application for the web browser 220. The browser extension 230 may be capable of executing one or more scripts (e.g., code, which may be written in a scripting language, such as JavaScript) to perform an operation in association with the web browser 220.

The web server 240 may include a device capable of serving web content (e.g., web documents, Hypertext Markup Language (HTML) documents, web resources, images, style sheets, scripts, and/or text). For example, the web server 240 may include a server and/or computing resources of a server, which may be included in a data center and/or a cloud computing environment. The web server 240 may process incoming network requests (e.g., from the client device 210) using Hypertext Transfer Protocol (HTTP) and/or another protocol. The web server 240 may store, process, and/or deliver web pages to the client device 210. In some implementations, communication between the web server 240 and the client device 210 may take place using HTTP.

The extension server 250 may include a device capable of communicating with the client device 210 to support operations of the browser extension 230. For example, the extension server 250 may store and/or process information for use by the browser extension 230. As an example, the extension server 250 may store a list of domains applicable to a script to be executed by the browser extension 230. In some implementations, the client device 210 may obtain the list (e.g., periodically and/or based on a trigger), and may store a cached list locally on the client device 210 for use by the browser extension 230.

The recommendation system 260 may include one or more devices capable of receiving, generating, storing, processing, providing, and/or routing information associated with vehicle recommendations based on browser context, as described elsewhere herein. The recommendation system

260 may include a communication device and/or a computing device. For example, the recommendation system 260 may include a server, such as an application server, a client server, a web server, a database server, a host server, a proxy server, a virtual server (e.g., executing on computing hardware), or a server in a cloud computing system. In some implementations, the recommendation system 260 may include computing hardware used in a cloud computing environment.

The network 270 may include one or more wired and/or wireless networks. For example, the network 270 may include a cellular network (e.g., a long-term evolution (LTE) network, a code division multiple access (CDMA) network, a 3G network, a 4G network, a 5G network, or another type of next generation network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
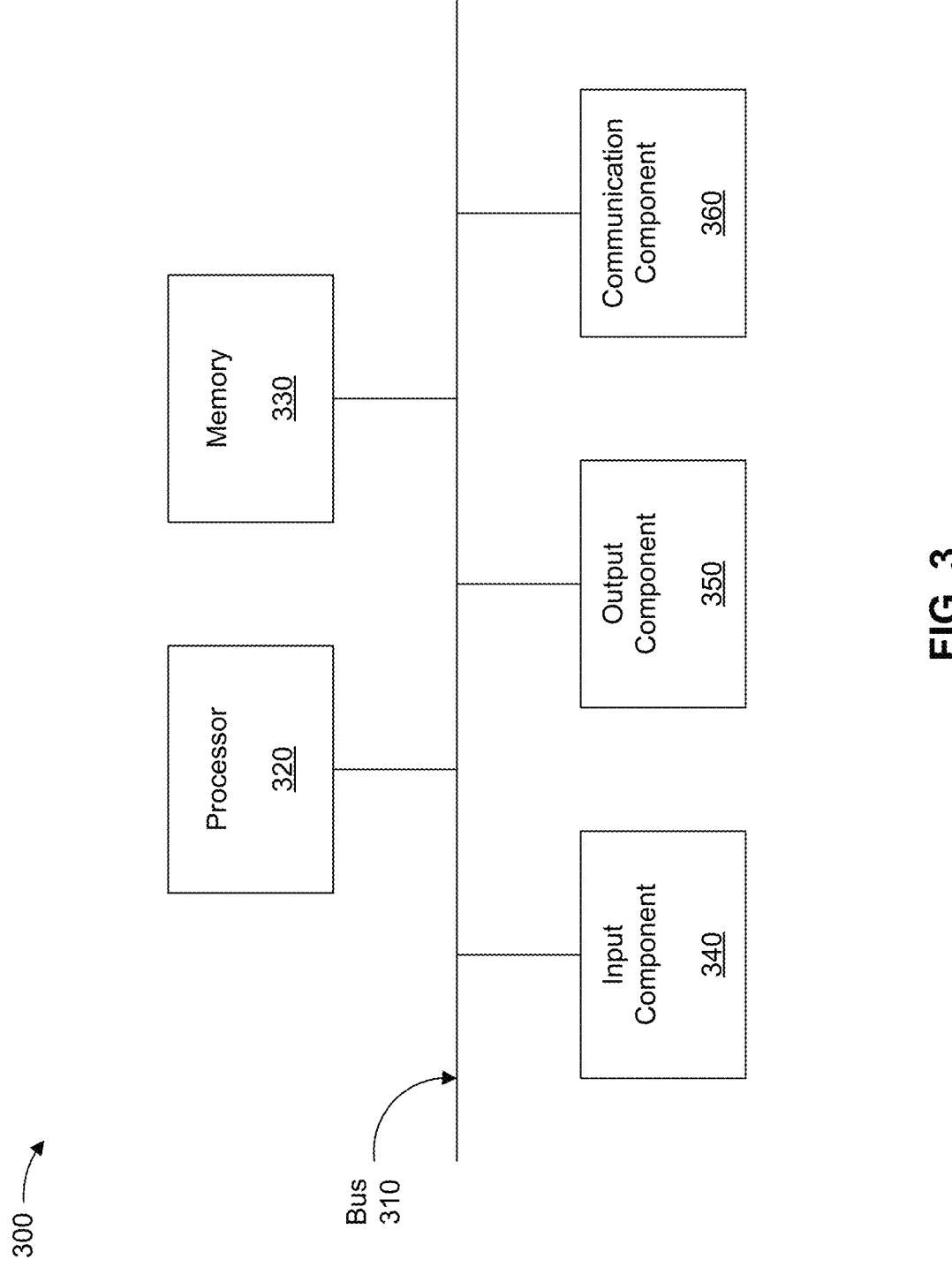
FIG. 3 is a diagram of example components of one or more devices of FIG. 2, in accordance with some embodiments of the present disclosure.

FIG. 3 is a diagram of example components of a device 300 associated with vehicle recommendations based on browser context. The device 300 may correspond to the client device 210, the web server 240, the extension server 250, and/or the recommendation system 260. In some implementations, the client device 210, the web server 240, the extension server 250, and/or the recommendation system 260 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 associated with vehicle recommendations based on browser context. In some implementations, one or more process blocks of FIG. 4 may be performed by the recommendation system 260. In some implementations, one or more process blocks of FIG. 4 may be performed by another device or a group of devices separate from or including the recommendation system 260, such as the client device 210, the web server 240, and/or the extension server 250. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving, from an application executing on a client device, information related to a browser context associated with the client device, wherein the browser context includes a historical pattern of browser interactions with content related to vehicles (block 410). For example, the recommendation system 260 (e.g., using processor 320, memory 330, input component 340, and/or communication component 360) may receive, from an application executing on a client device, information related to a browser context associated with the client device, wherein the browser context includes a historical pattern of browser interactions with content related to vehicles, as described above in connection with reference number 115 of FIG. 1A. As an example, a user of the client device may visit one or more dealer or manufacturer websites and interact with or view content related to one or more vehicles that are offered on the dealer or manufacturer websites, and information related to these interactions may be included in the browser context provided to the recommendation system. In another example, the user may engage in vehicle research by visiting one or more websites that include consumer reports, reviews, valuations, and/or other information related to vehicles that the user may be contemplating purchasing or otherwise interested in, and this browser history may be provided to the recommendation system for use in generating vehicle recommendations.

As further shown in FIG. 4, process 400 may include generating a vehicle feature vector that includes an array of elements to represent a plurality of vehicle attributes, wherein each element in the array of elements has a value to represent a user preference related to a corresponding vehicle attribute based on the historical pattern of browser interactions with the content related to vehicles (block 420). For example, the recommendation system 260 (e.g., using processor 320 and/or memory 330) may generate a vehicle feature vector that includes an array of elements to represent a plurality of vehicle attributes, wherein each element in the array of elements has a value to represent a user preference related to a corresponding vehicle attribute based on the historical pattern of browser interactions with the content related to vehicles, as described above in connection with reference number 120 of FIG. 1A. As an example, the vehicle feature vector may include elements to represent vehicle attributes such as a year, a make, a model, an engine or motor type, an exterior color, a mileage, a price, a fuel efficiency, a body style, a condition, a transmission, or the like. Accordingly, user preferences that are derived from the browser context provided by the client device or a combination of the browser context and user-specified questionnaire responses may be used to populate the vehicle feature vector to represent the overall preferences of the user with respect to various vehicle attributes.

As further shown in FIG. 4, process 400 may include applying a similarity model to the vehicle feature vector to determine a vehicle recommendation dataset that includes a plurality of vehicles that are each associated with a respective set of vehicle attributes (block 430). For example, the recommendation system 260 (e.g., using processor 320 and/or memory 330) may apply a similarity model to the vehicle feature vector to determine a vehicle recommendation dataset that includes a plurality of vehicles that are each associated with a respective set of vehicle attributes, as described above in connection with reference number 120 of FIG. 1A. As an example, the recommendation system may store vectorized information related to various vehicles that are available in inventories associated with one or more vehicle manufacturers, dealers, or other sellers, and the similarity model may be used to determine a similarity between the vehicle feature vector that represents the user's vehicle preferences and the vectorized information associated with each vehicle available in the vehicle inventories. Accordingly, in this example, the various vehicles in the vehicle inventories may be ranked according to the similarity (e.g., cosine distance) between the vehicle feature vector that represents the user's vehicle preferences and the vectorized information associated with each available vehicle.

As further shown in FIG. 4, process 400 may include filtering the vehicle recommendation dataset based on a subset of the information related to the browser context associated with the client device that indicates one or more financing preferences associated with a user associated with the client device (block 440). For example, the recommendation system 260 (e.g., using processor 320 and/or memory 330) may filter the vehicle recommendation dataset based on a subset of the information related to the browser context associated with the client device that indicates one or more financing preferences associated with a user associated with the client device, as described above in connection with reference number 125 of FIG. 1B. As an example, the browser context may include various sources of information that indicate the user's ability to obtain pre-approval or pre-qualification for vehicle financing (e.g., income, credit score, credit utilization, late payments, or the like), and the vehicle recommendation dataset may be filtered to exclude vehicles for which the user is unlikely to be able to obtain pre-approval or pre-qualification and/or to increase the rank associated with vehicles for which the user is likely to be pre-approved or pre-qualified. Additionally, or alternatively, the browser context may include other sources of information relevant to a financial status of the user, such as account balances, a self-configured budget, or any other suitable financial information that can be harvested from the browser context, which may be used to filter the vehicle recommendation dataset.

As further shown in FIG. 4, process 400 may include providing information related to the vehicle recommendation dataset to the client device for display in an interface associated with the client device (block 450). For example, the recommendation system 260 (e.g., using processor 320 and/or memory 330) may provide information related to the vehicle recommendation dataset to the client device for display in an interface associated with the client device, as described above in connection with reference number 130 of FIG. 1B. As an example, the information provided to the client device may include a visual representation of the vehicles that are recommended for the user to allow the user to consider other vehicles that may be similar to the vehicles that the user has been viewing using the web browser of the client device. Furthermore, in some implementations, the information provided to the client device may include one or more options that the user may select to request or apply for pre-approval or pre-qualification to obtain financing for a recommended vehicle.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1B. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used.

Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for providing vehicle recommendations based on browser context, the system comprising:
one or more memories; and
one or more processors, communicatively coupled to the one or more memories, configured to:
    receive, based on executing one or more client-side browser fingerprinting scripts on a client device, information related to a browser context associated with the client device,
        wherein the browser context includes metadata from one or more micro-frontend widgets running on one or more vehicle dealer websites and a historical pattern of browser interactions with content related to vehicles;
    generate a vehicle feature vector that includes an array of elements to represent a plurality of vehicle attributes,
        wherein each element in the array of elements has a value to represent a user preference related to a corresponding vehicle attribute based on the historical pattern of browser interactions with the content related to vehicles;
    apply a similarity model to the vehicle feature vector to determine a vehicle recommendation dataset that includes a plurality of vehicles that are each associated with a respective set of vehicle attributes;
    filter the vehicle recommendation dataset based on a subset of the information related to the browser context associated with the client device that indicates one or more financing preferences associated with a user associated with the client device; and
    provide information related to the vehicle recommendation dataset to the client device for display in an interface associated with the client device.

2. The system of claim 1,
wherein the one or more processors are further configured to:
    determine a location associated with the client device based on the information related to the browser context associated with the client device,
        wherein the vehicle recommendation dataset is filtered such that the information displayed in the interface associated with the client device is related to vehicles that are within a threshold distance of the location associated with the client device.

3. The system of claim 1,
wherein the one or more processors are further configured to:
    store vectorized information associated with each vehicle in a vehicle inventory; and
    determine the vehicle recommendation dataset based on respective cosine distances between the vehicle feature vector and the vectorized information associated with each vehicle in the vehicle inventory.

4. The system of claim 1,
wherein the one or more processors, to filter the vehicle recommendation dataset, are configured to:

determine, for each of the plurality of vehicles included in the vehicle recommendation dataset and based on the one or more financing preferences associated with the user associated with the client device, a probability that the user will qualify to enter into a transaction associated with the vehicle; and
    remove, from the plurality of vehicles included in the vehicle recommendation dataset, one or more vehicles based on the probability that the user will qualify to enter into a transaction for each of the plurality of vehicles included in the vehicle recommendation dataset.

5. The system of claim 1,
wherein the historical pattern of browser interactions includes one or more browser sessions in which the client device accessed a vehicle manufacturer or vehicle dealer website to view or configure a vehicle having a set of vehicle attributes.

6. The system of claim 1,
wherein the browser context includes a browser fingerprint that is based on the historical pattern of browser interactions with content related to vehicles, metadata obtained from one or more services that indicates the one or more financing preferences associated with the user, and a profile associated with advertising content presented to the user.

7. The system of claim 1,
wherein the one or more processors are configured to:
    receive, based on executing the one or more client-side browser fingerprinting scripts on the client device, information related to a browser interaction with content related to a vehicle; and
    determine, based on the one or more financing preferences associated with the user associated with the client device, that a probability of the user qualifying to enter into a transaction for the vehicle associated with the browser interaction fails to satisfy a threshold,
        wherein the information related to the vehicle recommendation dataset indicates a vehicle associated with one or more of a different year, make, or model than the vehicle associated with the browser interaction based on a probability of the user qualifying to enter into a transaction for the vehicle associated with the different year, make, or model satisfying the threshold.

8. The system of claim 1,
wherein the one or more processors are configured to:
    apply a filter to the vehicle recommendation dataset to ensure that each vehicle in the vehicle recommendation set has a different vehicle make and vehicle model combination.

9. The system of claim 1,
wherein the plurality of vehicle attributes includes one or more of a year, a make, a model, a mileage, a price, a fuel efficiency, an engine or a motor, a fuel type, a drive train, an exterior color, a body style, a condition, or a transmission.

10. A method for providing context-aware recommendations, comprising:
receiving, by a device and based on executing one or more client-side browser fingerprinting scripts on a client device, information related to a browser context associated with the client device,
    wherein the browser context includes metadata from one or more micro-frontend widgets running on one or more vehicle dealer websites and a historical pattern of browser interactions with content related to vehicles, and wherein the browser context indicates a location associated with the client device;

generating, by the device, a vehicle feature vector that includes an array of elements to represent a plurality of vehicle attributes, wherein each element in the array of elements has a value to represent a user preference related to a corresponding vehicle attribute based on the historical pattern of browser interactions with the content related to vehicles;

applying, by the device, a similarity model to the vehicle feature vector to determine a vehicle recommendation dataset that includes a plurality of vehicles that are each associated with a respective set of vehicle attributes;

filtering, by the device, the vehicle recommendation dataset based on a subset of the information related to the browser context associated with the client device that indicates a profile of a user associated with the client device, wherein the vehicle recommendation dataset is filtered such that the vehicle recommendation dataset excludes any vehicles that are not within a threshold distance of the location associated with the client device; and providing, by the device, information related to the vehicle recommendation dataset to the client device for display in an interface associated with the client device.

11. The method of claim 10, further comprising:

storing vectorized information associated with each vehicle in a vehicle inventory; and determining the vehicle recommendation dataset based on a cosine distance between the vehicle feature vector and the vectorized information associated with each vehicle in the vehicle inventory.

12. The method of claim 10, wherein filtering the vehicle recommendation dataset comprises:

determining, based on the profile of the user associated with the client device, a probability that the user will qualify to enter into a transaction for each of the plurality of vehicles included in the vehicle recommendation dataset; and removing, from the plurality of vehicles included in the vehicle recommendation dataset, one or more vehicles based on the probability that the user will qualify to enter into a transaction for each of the plurality of vehicles included in the vehicle recommendation dataset.

13. The method of claim 10, wherein the historical pattern of browser interactions includes one or more browser sessions in which the client device accessed a vehicle manufacturer or vehicle dealer website to view or configure a vehicle having a set of vehicle attributes.

14. The method of claim 10, wherein the browser context includes a browser fingerprint that is based on the historical pattern of browser interactions with content related to vehicles, metadata obtained from one or more services that indicates the profile of the user, and a profile associated with advertising content presented to the user.

15. The method of claim 10, comprising:

receiving, based on executing the one or more client-side browser fingerprinting scripts on the client device, information related to a browser interaction with content related to a vehicle; and determining, based on the profile of the user associated with the client device, that a probability of the user qualifying to enter into a transaction for the vehicle associated with the browser interaction fails to satisfy a threshold, wherein the information related to the vehicle recommendation dataset indicates a vehicle associated with one or more of a different year, make, or model than the vehicle associated with the browser interaction based on a probability of the user qualifying to enter into a transaction for the vehicle associated with the different year, make, or model satisfying the threshold.

16. A non-transitory computer-readable medium storing a set of instructions, the set of instructions comprising:

one or more instructions that, when executed by one or more processors of a system, cause the system to:

receive, based on executing one or more client-side browser fingerprinting scripts on a client device, information related to a browser context associated with the client device, wherein the browser context includes a historical pattern of browser interactions that includes one or more browser sessions in which the client device accessed a vehicle manufacturer or vehicle dealer website to view or configure a vehicle having a set of vehicle attributes, and wherein the browser context includes metadata from one or more micro-frontend widgets running on one or more vehicle dealer websites;

generate a vehicle feature vector that includes an array of elements to represent a plurality of vehicle attributes, wherein each element in the array of elements has a value to represent a user preference related to a corresponding vehicle attribute based on the historical pattern of browser interactions;

apply a similarity model to the vehicle feature vector to determine a vehicle recommendation dataset that includes a plurality of vehicles that are each associated with a respective set of vehicle attributes;

filter the vehicle recommendation dataset based on creditworthiness information associated with a user of the client device; and provide information related to the vehicle recommendation dataset to the client device for display in an interface associated with the client device.

17. The non-transitory computer-readable medium of claim 16, wherein the one or more instructions further cause the system to:

determine a location associated with the client device based on the information related to the browser context associated with the client device, wherein the vehicle recommendation dataset is filtered such that the information displayed in the interface associated with the client device is related to vehicles that are within a threshold distance of the location associated with the client device.

18. The non-transitory computer-readable medium of claim 16, wherein the one or more instructions further cause the system to:

store vectorized information associated with each vehicle in a vehicle inventory; and determine the vehicle recommendation dataset based on a cosine distance between the vehicle feature vector and the vectorized information associated with each vehicle in the vehicle inventory.

19. The non-transitory computer-readable medium of claim 16, wherein the one or more instructions, that cause the system to filter the vehicle recommendation dataset, cause the system to:

determine, based on the creditworthiness information associated with the user of the client device, a probability that the user will qualify to enter into a transaction for each of the plurality of vehicles included in the vehicle recommendation dataset; and remove, from the plurality of vehicles included in the vehicle recommendation dataset, one or more vehicles based on the probability that the user will qualify to enter into a transaction for each of the plurality of vehicles included in the vehicle recommendation dataset.

20. The non-transitory computer-readable medium of claim 16, wherein the one or more instructions further cause the system to:

receive, based on executing the one or more client-side browser fingerprinting scripts on the client device, information related to a browser interaction with content related to a vehicle; and determine, based on the creditworthiness information associated with the user of the client device, that a probability of the user qualifying to enter into a transaction for the vehicle associated with the browser interaction fails to satisfy a threshold, wherein the information related to the vehicle recommendation dataset indicates a vehicle associated with one or more of a different year, make, or model than the vehicle associated with the browser interaction based on a probability of the user qualifying to enter into a transaction for the vehicle associated with the different year, make, or model satisfying the threshold.

* * * * *